Aug. 31, 1948.  L. R. BUCKENDALE  2,448,014
DUAL ENGINE VEHICLE COOLING SYSTEM
Filed June 7, 1945  2 Sheets-Sheet 1

Lawrence R. Buckendale
INVENTOR

BY Strauch & Hoffman
ATTORNEYS

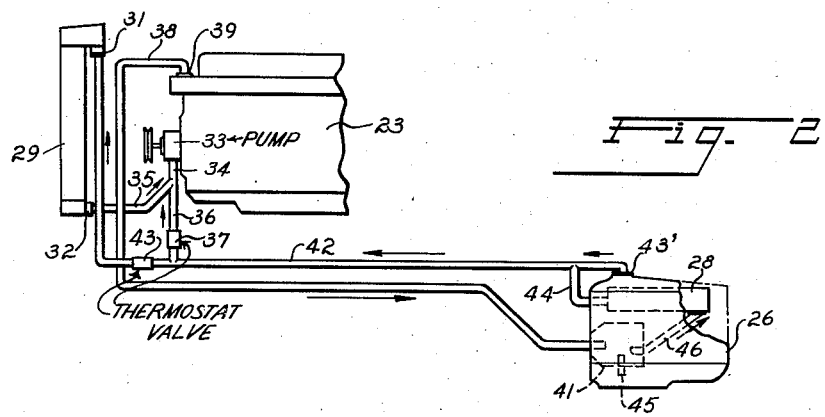
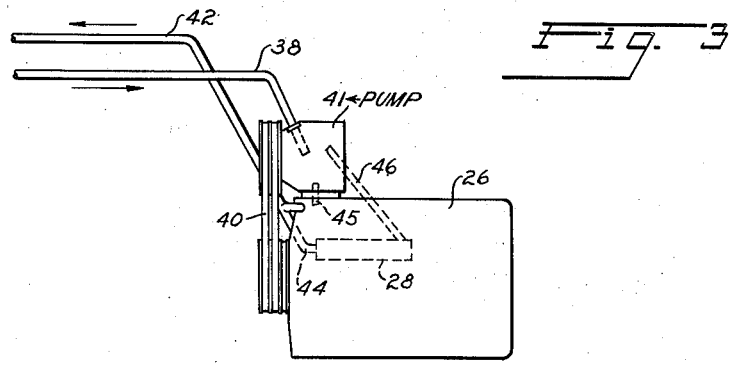
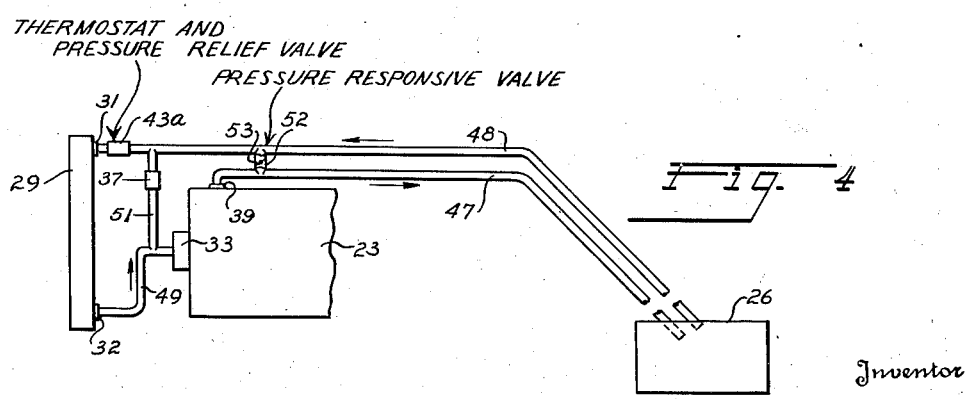

Patented Aug. 31, 1948

2,448,014

UNITED STATES PATENT OFFICE 2,448,014

DUAL ENGINE VEHICLE COOLING SYSTEM

Lawrence R. Buckendale, Detroit, Mich., assignor to The Timken-Detroit Axle Company, Detroit, Mich., a corporation of Ohio Application June 7, 1945, Serial No. 598,053

14 Claims. (Cl. 60—97)

This invention relates to cooling systems for automotive vehicles and particularly to associated cooling systems for a plurality of otherwise independent power plants in an automotive vehicle.

In its preferred embodiment about to be described, the invention is especially applicable to an automotive vehicle of the type wherein a main internal combustion engine is provided for driving the vehicle under normal road and tractive conditions, and an auxiliary or booster internal combustion engine is provided for supplementing the drive of the main engine under certain usually temporary conditions requiring added power and traction.

The engines may drive the same axle or different axles without departing from the spirit of the invention, and may be operable separately or together.

Vehicles employing selectively operable engines having their cooling fluid passages coupled through suitable conduits to a single radiator disposed adjacent the front end have heretofore been proposed. The present invention is concerned mainly with improvements in such cooling systems for efficiently routing the circulating cooling fluid especially in such manner as to advantageously prepare the auxiliary or booster engine for operation when needed, and for assuring optimum association of the system with a single radiator device wherein the cooling fluid is air cooled.

With the above in mind it is a major object of the present invention to provide a multi-engine vehicle cooling system embodying special novel conduits and thermostatically controlled valve arrangements for efficiently preheating the booster engine to operative temperature and associating the system with a cooling device such as an air cooled radiator.

A further object of the invention is to provide a novel cooling system for associated main and auxiliary engines in a vehicle wherein substantially all the cooling fluid from the operating main engine cooling passages is initially circulated through passages in the auxiliary engine, and a suitable fluid cooling device such as a radiator is included in the system only after the temperature of the circulating cooling fluid reaches a predetermined temperature.

A further object of the invention resides in the provision of a special by-pass arrangement in a cooling system common to a pair of independently operable engines for driving a motor vehicle whereby flow of an excess amount of heated cooling fluid from the larger main engine to the smaller booster engine is prevented.

It is a further object of the invention to provide a novel cooling fluid circulation arrangement in the auxiliary engine of a dual engine motor vehicle wherein fluid heated by the main engine is circulated simultaneously through the main cooling fluid passages of the auxiliary engine and through a water jacket surrounding the intake manifold of the auxiliary engine whereby the auxiliary engine is brought up speedily and efficiently to a temperature where it will start easily when its operation is desired.

A further object of the invention is to provide a novel system of conduits and thermostatic valves in a cooling system for two independently operable engines in an automotive vehicle wherein said valves are operable to selectively include a cooling device in the system when the cooling fluid therein reaches a predetermined temperature.

A further object of the invention will presently appear as the description proceeds in connection with the appended claims and annexed drawings wherein Figure 1 is a top plan view diagrammatically illustrating a dual engine drive vehicle provided with the cooling system arrangement of the present invention according to a preferred embodiment;

Figure 2 is a diagrammatic side elevation of the cooling system of the vehicle of Figure 1, a pump being added at the auxiliary engine for promoting flow of the cooling fluid;

Figure 3 is a top plan view of the auxiliary engine usable in the system of Figure 2 showing more in detail the auxiliary pump mounted on it; and Figure 4 is a diagrammatic side elevation of a cooling system according to a further embodiment of the invention wherein a special by-pass is provided for preventing flow of excessive quantities of hot fluid to the auxiliary engine.

Figure 1:
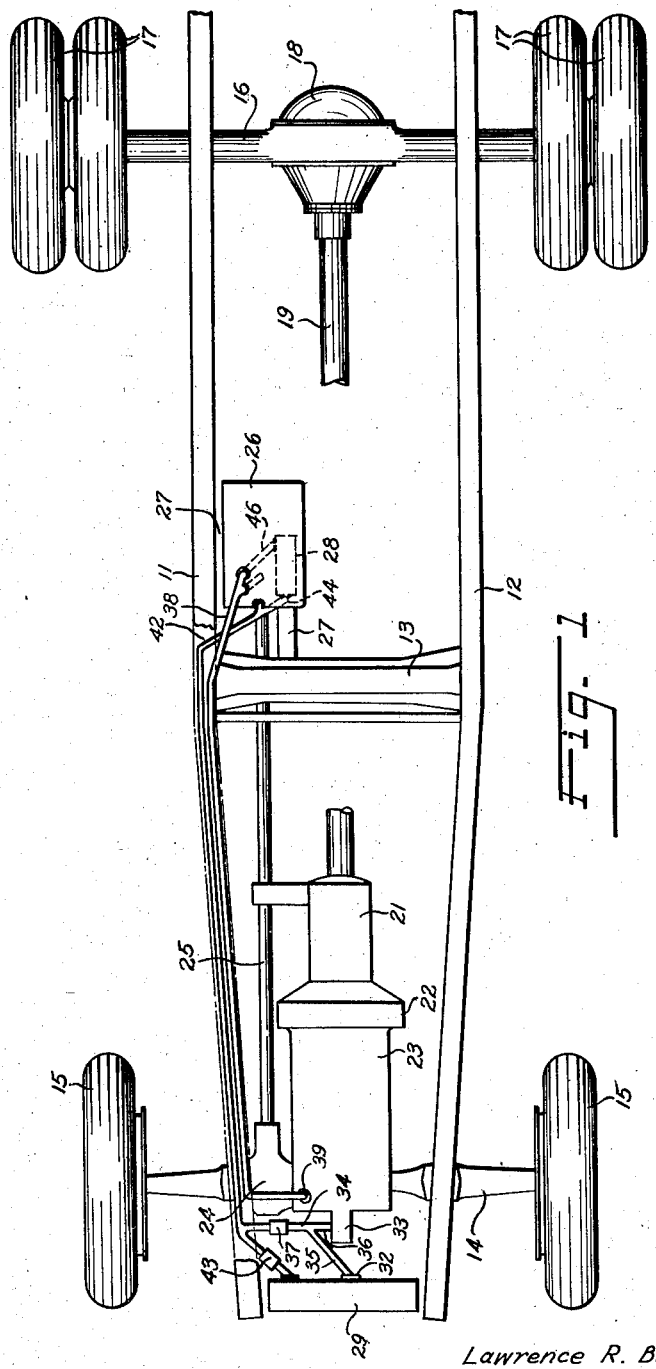

Referring now to Figure 1, a truck chassis comprising a pair of longitudinally channeled side rails 11 and 12 interconnected by lateral frame rails including a main central rail 13 has its front end supported by a steer drive axle 14 provided with dirigible wheels 15 at opposite ends, and has its rear end supported by a rear axle 16 provided with dual wheels 17 at opposite ends.

Rear axle 16 is preferably a conventional rear drive axle having a differential bowl 18 in which is contained mechanism drive-connected to the opposite wheels and to a propeller shaft 19 coupled through a transmission 21 and a clutch 22 to a main internal combustion engine 23 which may be of the usual gasoline or diesel fuel oil type. Main engine 23, which is disposed at the front of the vehicle, and propeller shaft 19 are preferably disposed along the longitudinal center line of the vehicle and comprise the usual drive assembly found in the conventional rear wheel drive truck.

Front axle 14 is preferably of a known steer drive type, such as that shown in United States Letters Patent No. 2,309,432 which comprises a differential gearing and clutch housing portion 24 connected by a propeller shaft assembly indicated at 25 to an auxiliary or booster engine 26 supported on suitable lateral frame members 27 adjacent one side rail 11 of the vehicle frame about midway between the axles. In practice, auxiliary engine 26 is preferably of much smaller power capacity than the main engine and is employed chiefly for augmenting the main engine drive when the necessity for increased power arises, such as when going up hill or traveling through sand or other unusual road conditions requiring high power and high tractive efforts. During normal operation, the vehicle is driven by engine 23 and rear wheels 17 as in conventional truck operation. During this normal period, auxiliary engine 26 does not operate as the housing 24 may include a normally disconnected clutch such as that shown in said United States Letters Patent No. 2,309,432 so that the front wheels are idly driven and do not drive back to the auxiliary engine.

The auxiliary engine is used only at times when increased power is needed, as above explained. In order to increase the ability of this auxiliary engine to start almost instantaneously when such added power is demanded, my cooling system is designed to efficiently utilize heated cooling fluid from the operating main engine to speedily raise the temperature of the auxiliary engine so that it will not be cold and difficult to start when its use is desired. A suitable conduit system and associated valving and other controls for accomplishing this purpose, together with the association of this system with a cooling device, comprise the essential features of the present invention.

Each of engines 23 and 26 has the conventional internal cooling fluid passages extending about the valves and cylinders, such as is provided in the ordinary internal combustion engine, and in addition auxiliary engine 26 is preferably provided with a special water jacket indicated at 28 surrounding the intake manifold for aiding vaporization of the entering fuel and assisting quick starting of that engine.

My cooling system preferably employs only a single radiator 29 located in the usual place at the front end of the vehicle. This radiator may be of the usual cored type wherein the cooling fluid is cooled by passage of air along the exterior of tubes in which the fluid is circulated and provided with top inlet and bottom outlet connections indicated at 31 and 32, respectively. In view of its function in handling the cooling fluid for both engines, radiator 29 is preferably of the oversized type usually employed in tropic countries, for example, sufficient in capacity for handling the entire volume of cooling fluid for the two engines.

Main engine 23 is provided with the usual cooling fluid circulation pump 33 driven by the fan shaft, and this pump is provided with an outlet conduit 34 branched to provide a conduit 35 leading to bottom radiator connection 32 and a conduit 36 in which is located a thermostatically controlled valve 37. A conduit 38 extends from a suitable outlet connection 39 of the water jacket of main engine 23 to auxiliary engine 26, where it may be coupled directly to the auxiliary engine cooling fluid passages as in Figure 1, or to a suitable auxiliary pump 41 driven from the fan shaft of engine 26 as by belt 40, as in Figure 2. Engine 26 may also be provided with the conventional pump driven by the fan shaft for accelerating fluid flow therethrough.

The upper radiator inlet connection 31 is connected by a conduit 42 containing a thermostatically controlled valve 43 directly to cooling fluid passages of auxiliary engine 26, this connection preferably being through a fitting 43' to which the usual engine to radiator outlet hose connection is made in a conventional assembly. A branch conduit 44 leads from a point on conduit 42 forwardly of fitting 43' to the water jacket passage at 28 about the intake manifold.

Where an auxiliary pump is provided as in Figure 2, pump 41 is provided with two outlets, an outlet passage 45 connected to the usual internal cooling fluid passages of engine 26, and an outlet passage 46 leading to the intake manifold water jacket at 28. Where no auxiliary pump is provided, conduit 46 from the manifold water jacket preferably rejoins conduit 38 outside the engine as illustrated in Figure 1.

In normal operation of the vehicle traveling along a highway only engine 23 is operated to drive the rear wheels through the conventional drive system. During this time, engine 26 is not operating nor is it drive connected to the front axle, so that unless special arrangements are provided for its heating it will be relatively cold until started.

Initially, when engine 23 is warming up and the water in its cooling passages is below a predetermined temperature, for example 185 degrees F., which will be called the cold condition, thermostatic valve 37 is open and thermostatic valve 43 is closed. This provides a closed cooling fluid circuit which includes the cooling fluid passages of both engines and excludes radiator 29. Valves 37 and 43 may be any of the usual types found in automotive engine cooling systems for controlling water circulation by temperature of the fluid. As engine 23 warms up, the cooling fluid circulating therethrough speedily becomes increasingly and cumulatively heated and this heated fluid from engine 23 is delivered directly to engine 26 in a minimum time so as to impart maximum heat therefrom to engine 26 with minimum loss of heat in transmission.

Referring to Figure 2, the cooling fluid delivered to pump 41 is forced through passage 45 into and through the usual internal cooling fluid passages of engine 26 and out through fitting 43', and is also forced through conduit 46 and the water jacket passage at 28 out through conduit 44 to enter return conduit 42, which conveys all the cooling fluid back toward the main engine. During its traverse of the passages of engine 26, the cooling fluid gives away a large portion of its heat and this heat is retained and accumulates in that engine by the high thermal retentivity of the large metal mass of engine 26.

While engine 23 is in its cold condition, wherein the circulating cooling fluid is below a predetermined temperature such as 185 degrees F., thermostatic valve 37 remains open and thermostatic valve 43 remains closed. Both of these valves are located close to the junction between conduits 42 and 36 so that they are substantially equally affected by the temperature of the returning fluid in conduit 42. Under the cold condition of engine 23 with flow blocked by thermostatic valve 43, the returning fluid rises through conduits 36 and 34 to enter pump 33 which recirculates it through the internal passages of engine 23 and the cycle is repeated. During this period none of the cooling fluid enters radiator 29, so that the cumulative heating occasioned by recirculation of the cooling fluid through engine 23 without loss of heat other than in engine 26 rapidly builds up the temperature of the recirculating cooling fluid until it approaches the operating temperature of engine 23. This is sufficient to raise the temperature of engine 26 high enough that it will start quickly when desired. Although conduit 35 is open to conduit 34, none of the returning recirculating fluid in conduit 36 enters conduit 35 due to the suction of pump 33.

As soon as the operation of engine 23 has heated the cooling fluid until a predetermined operating temperature prevails in the return conduit 42, valve 37 automatically closes in response to the temperature of the fluid and simultaneously valve 43 is opened. This provides that the returning cooling fluid in conduit 42 does not return directly to engine 23 but instead enters the top radiator connection 31 and is passed through radiator 29 where it experiences cooling by the air rushing through radiator 29 before it emerges from bottom radiator fitting 32 into conduit 35 for circulation through the main engine. If at any time during operation of the main engine the temperature of the cooling fluid in the return conduit 42 drops below the predetermined amount as during subzero weather, valve 43 automatically closes and valve 37 reopens automatically to again raise the temperature to its desired operating level.

Should the vehicle complete a trip without encountering any conditions where operation of auxiliary engine 26 is needed, it is probable that this automatic opening and closing of valves 37 and 43 may take place a number of times, since the long recirculation path back to the auxiliary engine exerts a cooling effect on the fluid and reduces its temperature. This, however, has no harmful effects on operation of main engine 23 and it maintains the auxiliary engine sufficiently hot for immediate starting.

The existence of added pump 41 in the circuit as in Figure 2 assures a more positive circulation of the cooling fluid through engine 26 and takes the load off pump 33 of the main engine.

Where a condition is encountered such as requires operation of the auxiliary engine 26, that engine is set into operation in a usual manner, such controls not being part of the present invention. When this occurs with valve 37 closed and valve 43 open so that the circulation of fluid is through both engines and the radiator, such circulation continues as before but the system must take care of the added heat of operating engine 26 which is now further heating the cooling fluid passing therethrough. Radiator 29 must be of such design and capacity that it will not allow the temperature of the cooling fluid in the system to rise above the boiling point or at least above a predetermined operating level when both engines are operating at high speed.

Should the auxiliary engine be set in operation during the period when main engine 23 is warming up, with valve 43 closed and valve 37 open so that the radiator is by-passed, this has no effect upon the above described operation beyond the assuring that the cooling fluid will become heated to operating temperature more quickly due to the added heat from engine 26, and valve 43 will be opened sooner when engine 26 is not operated.

My novel cooling system is efficient in operation and simple in construction. It utilizes normally wasted heat developed by the main engine to heat up the auxiliary engine for maximum efficiency of starting and provides for introduction of a cooling device into the system once the fluid has attained a predetermined high temperature. Similarly, it automatically reverts back to storage of heat in the system when the temperature of the circulating fluid falls below the predetermined level. By dividing the entering hot fluid at engine 26 and distributing it among the conventional water passages and the intake manifold jacket, I efficiently and quickly warm those parts of the auxiliary engine which affect its ability to start quickly, and extract maximum heat from the heated fluid passing therethrough during the short period that such fluid remains in the auxiliary engine.

In some vehicles, particularly those contemplated in the invention, engine 26 has only about one-half the power output capacity of engine 23, so that if the auxiliary engine is a standard commercial model, such as a conventional four cylinder engine, its water circulation passages are of much smaller opening and volume than those of main engine 23 which is usually a six cylinder engine. Hence the quantity of heated fluid discharged at fittings 39 of engine 23 may be beyond the capacity of engine 23 to pass, and difficulty may be encountered due to pressure build-up and surges in the conduits.

The embodiment illustrated in Figure 4 is intended to overcome this difficulty. The outlet fitting 39 of engine 23 has secured thereto a conduit 47 connected to the fluid passages of auxiliary engine 26, and a return conduit 48 is connected to top radiator fitting 31, thermostatically controlled valve 43a being provided in conduit 48. The bottom radiator fitting 32 has attached thereto a conduit 49 for conveying the fluid to main engine pump 33, and a branch conduit 51 containing thermostatically controlled valve 37 is provided between conduit 49 and conduit 48, being connected to conduit 48 upstream of valve 43a. Conduits 47 and 48 are connected adjacent fitting 39 by a short by-pass conduit 52 in which is located a pressure responsive valve 53 normally biased to close conduit 52. Valve 53 is adapted to pass some of the cooling fluid directly from conduit 47 to conduit 48 without first traversing the auxiliary engine 26 whenever the fluid pressure built up in conduit 47 is such to open it. For example, valve 53 may be pivoted butterfly valve held normally closed by a weight or spring and opened only when pressure of the fluid in conduit 47 forces it open and closed whenever the pressure is relieved.

In operation, the fluid outgoing through fitting 39 of main engine 23 passes through engine 26 in the same manner as in Figure 2, details here being omitted for simplicity, and returns to pass through either of valves 37 or 43a depending on which is open. When the fluid is below a predetermined temperature, valve 43a is closed and valve 37 is open so that the fluid is continuously circulated through the two engines and heated until its temperature is built up sufficiently to open valve 43a and close valve 37. Fluid circulation now continues with the cooling device 29 introduced into the circuit as in Figure 2. This operation is exactly the same as in Figure 2. Wherever the volume of fluid delivered to conduit 47 exceeds the capacity of engine 26, valve 53 is opened by the back pressure in conduit 47 and a portion of the hot fluid from conduit 47 is by-passed directly into conduit 48 to flow toward valves 37 and 43a, thereby relieving the pressure in conduit 47. The provision of this by-pass valve insures that special large-sized fluid passages do not have to be built into engine 26 to accommodate the large volume of water coming from the larger main engine. The fluid by-passed through conduit 52 undergoes the same path as the fluid it joins in conduit 48, either being recirculated directly or being passed through the radiator, depending on the temperature of the mixture encountering valves 43a and 37.

Valve 43a is essentially a thermally responsive valve in all embodiments of the invention and opens the cooling fluid circuit to radiator 29 when that fluid reaches a predetermined temperature. However, I have found that often during the period that the cooling fluid is being circulated in the circuit including both engines but excluding the radiator, which is the usual warm-up condition with one or both engines in operation and the cooling fluid below the temperature at a thermostatic valve becomes open, the fluid pressures built up in the system become very high and may burst some of the conduit or connections before the fluid becomes hot enough to open the thermostatic valve.

To eliminate this difficulty, I preferably provide at 43a a combined thermally responsive and pressure relief valve, the pressure relief portion simply comprising a normally closed by-pass for the thermostatically controlled passage through the valve, which pressure relief portion becomes open to relieve the pressure in the system whenever it exceeds a predetermined value. Valve 43a may be the combined pressure relief valve illustrated and described in United States Letters Patents Nos. 2,012,067 or 2,200,318, as desired. As soon as the pressure is relieved, as when the temperature of the fluid opens the thermostatic valve 43a, the pressure relief usually closes. The fluid passed by the pressure relief is simply by-passed to radiator 29. If desired, of course, such pressure relief can be otherwise embodied in the system for the same purpose without departing from the spirit of this phase of the invention. Valve 43 in Figures 1 and 2 may likewise be a combined thermostat and pressure relief controlled valve.

In both embodiments of the invention, the water in the portion of conduit 48 adjacent the thermostatically controlled valves will probably be hotter than that in engine 26, but this will be only a small difference practically and has no appreciable effect on the practical operation of the system. If important, it can be controlled by anticipatory action of the thermostats.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid cooling system for associated main and auxiliary engines employing a common fluid cooling device, means for repeatedly recirculating cooling fluid heated by operation of the main engine through the auxiliary engine without traverse of said cooling device and means operative when said cooling fluid has attained a predetermined temperature for automatically introducing said fluid cooling device into the system.

2. In the fluid cooling system defined in claim 1, said last means comprising valve means automatically responsive to the temperature of said fluid.

3. In the fluid cooling system defined in claim 1, said means for recirculating said cooling fluid comprising fluid pressure responsive means for proportioning the quantity of said cooling fluid circulated through said auxiliary engine.

4. In a dual engine cooling system comprising main engine cooling fluid passages, auxiliary engine cooling fluid passages and a fluid cooling device, a conduit connecting the discharge end of said main engine cooling fluid passages to said auxiliary engine cooling fluid passages, a return conduit connecting the discharge end of said auxiliary engine cooling fluid passages with said cooling device, conduit means connecting the outlet of said cooling device to said main engine cooling fluid passages, a by-pass conduit connected between said return conduit and said main engine cooling fluid passages, and valve means responsive to the temperature of said fluid operable to maintain said by-pass conduit open and to prevent direct discharge of said fluid from said return conduit to said cooling device when the temperature of said fluid is below a predetermined level, and being automatically operable to maintain said by-pass conduit closed and to provide for substantially direct discharge of said fluid from said return conduit to said cooling device when the temperature of said fluid exceeds said predetermined level.

5. In the dual engine cooling system defined in claim 4, said valve means comprising separate thermally responsive valves disposed respectively in said by-pass conduit and in said return conduit downstream of its connection to said by-pass conduit, one of said valves being open when the other is closed.

6. In the dual engine cooling system defined in claim 4, said by-pass conduit being connected to said conduit means interconnecting said cooling device with said main engine cooling fluid passages.

7. In a dual engine vehicle, a main engine, an auxiliary engine, a radiator, means operated by the main engine for circulating cooling fluid through both of said engines in succession including a bypass for said radiator, and thermally responsive means controlling said bypass for selectively including or omitting said radiator as part of the cooling fluid circuit.

8. In a cooling system for a dual engine vehicle provided with main and auxiliary engines, means for continuously recirculating fluid heated by operation of said main engine through said auxiliary engine including delivery and return conduits extending between said engines, and means providing a fluid pressure responsive by-pass between said conduits.

9. In a dual engine cooling system having a common cooling device and wherein cooling fluid heated by operation of a main engine is conveyed by a delivery conduit to an auxiliary engine, a return conduit from said auxiliary engine, and means automatically responsive to the temperature of said fluid alternatively connecting said return conduit to said main engine or said cooling device.

10. In the dual engine cooling system defined in claim 9, a pressure relief connection between said conduits.

11. In the dual engine cooling system defined in claim 9, a by-pass conduit between said delivery and return conduits, and a valve in said by-pass conduit operable in response to excessive fluid pressure in said delivery conduit.

12. In a fluid cooling system for associated dual engines employing a common cooling device, means for circulating cooling fluid adapted to be heated by operation of one or both of said engines through both engines without traverse of said cooling device, means operative when said cooling fluid has attained a predetermined temperature for automatically introducing said fluid cooling device into said system, and pressure relief means for by-passing said temperature controlled means to relieve excessive fluid pressure in said system.

13. In the fluid cooling system defined in claim 12, said last two means comprising a fluid responsive valve having pressure relief temperature means exposed to the fluid pressure of said system.

14. In the dual engine cooling system defined in claim 4, said valve means comprising thermally responsive valves disposed respectively in said by-pass conduit and in said return conduit downstream of its connection to said by-pass conduit, one of the valves being open when the other is closed, anad said valve in the return conduit having a normally closed pressure relief passage openable when the internal pressure in said system exceeds a pretermined amount before said fluid becomes sufficiently hot to open said thermostatic valve.

LAWRENCE R. BUCKENDALE.

REFERENCES CITED

The following references are of record in the file of this patent:

UNITED STATES PATENTS

| Number | Name | Date |
| --- | --- | --- |
| 1,335,990 | Short | Apr. 6, 1920 |
| 2,290,703 | Ormsby | July 21, 1942 |
| 2,384,470 | Keese et al. | Sept. 11, 1945 |